April 9, 1935.  E. FEIST  1,996,992
TELEPHONE SYSTEM
Filed June 4, 1934
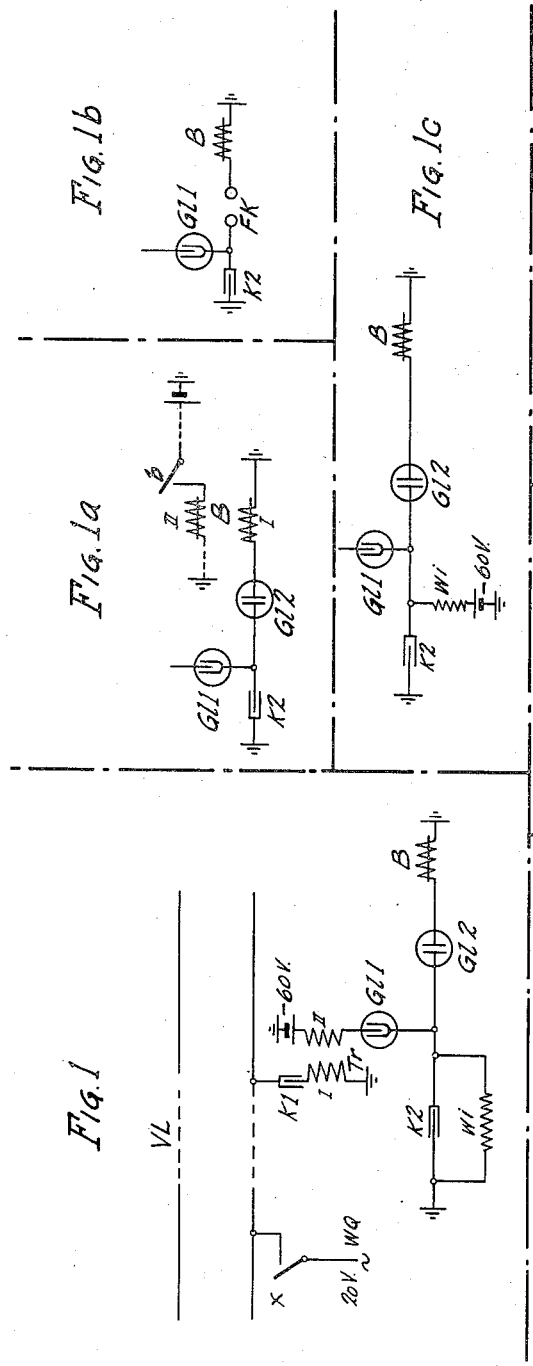
INVENTOR-
ERICH FEIST
ATTY.

Patented Apr. 9, 1935

1,996,992

UNITED STATES PATENT OFFICE 1,996,992

TELEPHONE SYSTEM

Erich Feist, Berlin, Germany, assignor to Siemens & Halske Aktiengesellschaft, Wernerwerk, Siemensstadt, near Berlin, Germany Application June 4, 1934, Serial No. 728,874
In Germany July 13, 1933

7 Claims. (Cl. 179—16)

The present invention relates to a circuit arrangement for the initiation of switching operations in telephone systems, more particularly over two conductor lines.

In such systems the possibility exists that criteria transmitted over the junction line for initiating a desired switching operation, also influence switching means similarly connected to the junction line which have nothing to do with the control of the desired switching operation, and thereby produce disturbances.

The present invention avoids this disadvantage in that the relay controlling the desired switching operation is connected in series with a glow lamp, and is operated through the discharge current of a condenser, which is charged up over the secondary winding, connected in series with a rectifier, of a transformer having a high ratio of transformation, the primary side of which is connected to the junction line through alternating current transmitted over this lead.

The attached figures show embodiments of the invention.

Fig. 1 shows a two-conductor junction line VL, over the lower lead of which the desired switching operation is produced. Upon initiation of this switching operation, contact $x$ is closed through a relay X (not shown), and a source of alternating current WQ of about twenty volts tension is connected to the lower lead of the line. This potential is, therefore, so low that ordinary telephone relays connected in this line which are proportioned for the ordinary working potential of sixty volts, cannot energize. The connected alternating current extends at the incoming end over the condenser KI and the primary winding I of the transformer $Tr$. The ratio of the transformation of the transformer $Tr$ is so chosen that the alternating potential induced in the secondary winding II of the transformer, which is superimposed as an additional potential on the pre-applied continuous potential of sixty volts connected to this winding, effects the striking of the glow-lamp GLI. The glow-lamp GLI acts as a rectifier. After striking of the glow-lamp GLI a flow of current takes place, through which the condenser K2 is gradually charged, and is brought to a potential which exceeds the striking potential of the lamp GH2. The glow-lamp GL2 is struck; the continuous current relay B is caused to energize through the discharge current arising from the condenser K2, which produces the desired switching operation. In order to avoid a gradual charging up of the condenser K2 through wrong striking, a high-value discharge resistance Wi can be provided in parallel with the condenser K2, over which a charging up of the condenser K2 caused by wrong striking can be balanced out.

The transformer $Tr$ and the condenser KI can suitably be so constructed that resonance exists in the frequency emitted by the source of alternating current WQ, whereby as good an effect as possible of the transformed energy—in itself fairly small—is achieved.

The arrangement becomes still more sensitive if a relay connected in a local holding circuit with little holding power is caused to fall away through the condenser impulse given over the glow lamp GL2. Fig. 1a represents such an arrangement. The winding II of relay B is connected over contact $b$ in a local holding circuit; through the impulse extending over the winding I of relay B after striking of the glow-lamp GL2, the counter-field generated in the winding I effects the deenergization of relay B.

In place of the glow-lamp GL2 a spark gap FK can also be employed, which is shunted through the discharge impulse of the condenser K2, and operates relay B. Such an arrangement is shown in Fig. 1b.

In order to shorten the time necessary for the charging of the condenser, the condenser K2 can be precharged as shown in Fig. 1c. The condenser K2 is here already precharged over the resistance Wi to a potential of sixty volts, and it is, therefore, only necessary, in initiating the desired switching operation, to charge it up to about thirty volts more, in order to reach the potential necessary for striking the glow-lamp GL2. The pre-applied potential for the condenser K2 must, of course, be less than the extinguishing potential of the glow-lamp GL2, in order not to maintain, after striking of the glow-lamp, a continuous flow of current over this.

In Fig. 2 the glow-lamp GL2 of Fig. 1 is replaced by a contact $u$, which is closed for a short time, for example, through a slow interrupter provided in common for several lines at regular time intervals, for instance, every half second. The condenser K2 then, in case the desired switching operation was initiated, discharges over the circuit formed upon closing of contact $u$, and operate the relay B. The time interval between two closings of the contact $u$ is so proportioned that the condenser K can be charged up with certainty to the potential necessary for the operation of the relay during this time.

Figs. 3a and 3b show embodiments in which, in contrast to the foregoing embodiments, the primary winding I of the transformer $Tr$ is not arranged on a lead, but in shunt between both leads of the junction line. Fig. 3a shows an arrangement for impulse transmission over the leads connected in series, and Fig. 3b for simultaneous transmission i. e., in parallel over both leads of the junction line.

Having described the invention, what is considered to be new and is desired to be protected by Letters Patent will be set forth in the following claims.

What is claimed is:

1. In a telephone system, a trunk line, means for transmitting alternating current over said trunk line, a transformer having a high rate of transformation and having its primary winding connected to said trunk line, a condenser connected in circuit with the secondary winding of said transformer, a rectifier connected in series with said condenser and said secondary winding, said condenser being charged over said circuit responsive to said alternating current, and a switching relay connected to said condenser operated by the discharge current from said condenser.

2. In a telephone system, a trunk line, means for transmitting alternating current over said trunk line, a transformer having its primary winding connected to said trunk line, a rectifier and a condenser connected in series with the secondary winding of said transformer, said condenser charged responsive to the transmission of said alternating current over said trunk line, and a switching relay connected between said rectifier and said condenser operated by the discharge current of said condenser.

3. A circuit arrangement as claimed in claim 1 in which the primary winding of the transformer is connected in shunt of the conductors of the trunk line.

4. A circuit arrangement as claimed in claim 1 in which the primary winding of the transformer is connected to one of the conductors of the trunk line.

5. In a telephone system, a trunk line, means for transmitting alternating current over said trunk line, a transformer having its primary winding connected to said trunk line, a rectifier and a condenser connected in series with the secondary winding of said trunk line, means for initially charging said condenser, means for further charging said condenser at a higher value responsive to the application of said alternating current to said trunk line, and a switching relay connected to said condenser and operated only by the discharge current of said condenser at said higher value.

6. In a telephone system, a trunk line, means for transmitting alternating current over said trunk line, a transformer having its primary winding connected to said trunk line, a rectifier and a condenser connected in series with the secondary winding of said transformer, a glow-lamp and a switching relay connected in series to a point between said condenser and said rectifier, said condenser charged responsive to the alternating current on said trunk line and discharged through said glow-lamp to operate said switching relay.

7. A circuit arrangement as claimed in claim 6 in which the switching relay comprises two windings, one of said windings normally energized over a local circuit and the other winding connected in series with said glow-lamp and said condenser, said other winding energized by the discharge current of said condenser and effective to generate a magnetic field in the relay opposite to that generated by said first winding to thereby effect the deenergization of the relay.

ERICH FEIST.